United States Patent
Fauran et al.

[15] 3,665,014
[45] May 23, 1972

[54] 2-SUBSTITUTED 4-PROPARGYLOXYMETHYL-2-ETHOXY-CARBONYL-γ-BUTYROLACTONES

[72] Inventors: Claude P. Fauran; Guy M. Raynaud, both of Paris; Bernard M. Pourrias, Meudon; Colette A. Douzon, Paris, all of France

[73] Assignee: Delande S.A.

[22] Filed: Aug. 21, 1969

[21] Appl. No.: 852,086

[30] Foreign Application Priority Data

Sept. 17, 1968    Great Britain......................44,026/68

[52] U.S. Cl............................................260/343.6, 424/279
[51] Int. Cl. ..........................................C07d 5/06
[58] Field of Search...............................260/343.6

[56] References Cited

OTHER PUBLICATIONS

Wagner and Zook, Synthetic Organic Chemistry, Wiley & Sons, N.Y. 1953, pp. 346–347 and 838 relied on.

Primary Examiner—Alex Mazel
Assistant Examiner—Anne Marie T. Tighe
Attorney—Woodhams, Blanchard and Flynn

[57] ABSTRACT

A compound of the formula

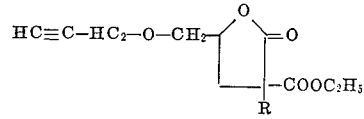

in which R is a saturated or unsaturated, straight or branched chain aliphatic hydrocarbon radical having 1 – 10 carbon atoms or an aryl aliphatic radical, in which the aryl may be substituted by one or more halogen atoms, one or more alkoxy radicals or a trifluoromethyl radical. The compound is prepared by reacting, in the presence of sodium ethylate, (1) 4-propargyloxymethyl-2-ethoxycarbonyl-γ-butyrolactone with (2) XR, wherein R has the same meaning as above and X is halogen. The compounds possess respiratory stimulating, analgesic and hypotensive properties.

5 Claims, No Drawings

2-SUBSTITUTED 4-PROPARGYLOXYMETHYL-2-ETHOXY-CARBONYL-γ-BUTYROLACTONES

The present invention concerns new substituted 4-propargyloxymethyl -2-ethoxycarbonyl -γ-butyrolactone, their process of preparation, and their therapeutic application.

The compounds according to the present invention correspond to the general formula (I)

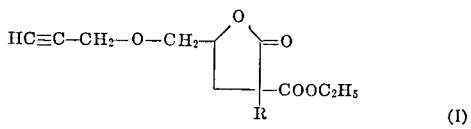
(I)

in which R represents a saturated or unsaturated, straight or branched chain aliphatic radical having one to 10 carbon atoms, or an arylaliphatic radical of which the aryl portion may be optionally substituted by one or more halogen atoms, one or more alkoxy radicals or a trifluoromethyl radical.

The process according to the present invention comprises reacting, in the presence of sodium ethylate, 4-propargyloxymethyl - 2 ethoxycarbonyl - ε- butyrolactone of the formula (II):

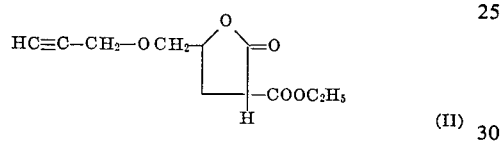
(II)

and a halogen derivative of the formula:
XR
in which X represents a halogen atom and R has the same significance as in formula (1).

The following preparations are given an non-limitative examples to illustrate the present invention.

EXAMPLE 1

4-Propargyloxymethyl-2-Benzyl-2-ethoxycarbonyl- ε- butyrolactone.

6 g. of sodium is introduced, with agitation, into 400 cc. of absolute ethanol and after dissolution is complete, the temperature of the solution is raised to 50° C. 60 g. of 4-propargyloxymethyl-2-ethoxycarbonyl-ε-butyrolactone is then added and maintained in contact for 1 hour. Whilst maintaining the temperature of the mixture at 50° C., 33g. of benzyl chloride are introduced and the mixture is kept under reflux for 3 hours. After cooling and adding 500 ml of water to dissolve the mineral salts formed, the ethanol is removed by distillation and the product formed is extracted with ethyl acetate. After decantation of the organic phase and removal of the solvent, a liquid product is obtained which is distilled.
Boiling point = 190° C. under 0.1 mm. Hg.
Yield = 83 percent

| Elementary analysis | C | H |
|---|---|---|
| Calculated | 68.34 | 6.37 |
| Found | 68.28 | 6.34 |

EXAMPLE 2.

4-Propargyloxymethyl-2-p-chlorobenzyl-2-ethoxycarbonyl-ε-butyrolactone.

To a solution of sodium ethylate (0.2 mol) in 400 cc. of absolute ethanol, there is successively added 45 g. of 4-propargyloxymethyl-2-ethoxy carbonyl -ε-butyrolactone, and, after 1 hour of contact at 50° C., 33g of p-chlorobenzyl chloride. The mixture is then maintained under reflux for 3 hours. After cooling, the ethanol is removed by distillation under reduced pressure, the mixture is taken up in 300 cc. of water and extracted several times with ethyl acetate. After concentration of the organic phase, an oily residue is obtained which is purified by distillation.
Boiling point = 206° C. under 0.05 mm. Hg.
Yield = 60 percent

| Elementary analysis | C | H | Cl |
|---|---|---|---|
| Calculated | 61.63 | 5.46 | 10.11 |
| Found | 61.74 | 5.45 | 10.26 |

EXAMPLE 3

4-Propargyloxymethyl 1-2-p-fluorobenzyl-2-ethoxycarbonyl-ε-butyrolactone

To a solution of sodium ethylate (0.35mol) in 500cc. of absolute ethanol, there is successively added 79 g. of 4-propargyloxymethyl-2-ethoxycarbonyl-ε-butyrolactone, and after 1 hour of contact, 50 g. of p-fluorobenzyl chloride. The mixture is then kept agitated for 2 hours at 50° C. The ethanol is then removed by distillation under reduced pressure, the residue is then taken up in water and extracted several times with ether. After concentration a residue is obtained which is purified by distillation.
Boiling point = 190° under 0.05 mm. Hg.
Yield = 72 percent

| Elementary analysis | C | H |
|---|---|---|
| Calculated | 64.66 | 5.73 |
| Found | 64.68 | 5.53 |

EXAMPLE 4

4-Propargyloxymethyl 2-p-methoxybenzyl 2-ethoxycarbonyl ε-butyrolactone

4-Propargyloxymethyl 2-p-methoxybenzyl-2-ethoxycarbonyl ε-butyrolactone is obtained according to the preceding examples by utilizing 4-pargyloxymethyl 2-ethoxycarbonyl-ε-butyrolactone and p-methoxybenzyl chloride.
Boiling Point = 210°–220°C under 0.05 mm. Hg.
Yield = 40 percent

| Elementary Analysis | C | H |
|---|---|---|
| Calculated | 65.88 | 6.40 |
| Found | 65.66 | 6.43 |

The compounds of the present invention have been studies on animals in the laboratory and have been shown to possess, in particular, respiratory stimulating, analgesic and hypotensive properties.

1. RESPIRATORY STIMULATING PROPERTIES

This action has been observed in the anaesthetised guinea-pig subject to respiratory depression provoked by the intraveinous injection of morphine hydrochloride. In these conditions, the compounds according to the present invention exert a favorable effect on the respiratory frequency and rhythm.

The results obtained with three of the compounds of general formula (I) are shown in Table I below:

TABLE I

| R | Mg./kg./IV | Percent |
|---|---|---|
| —CH$_2$—C$_6$H$_5$ | 5 | 60 |
| —CH$_2$—C$_6$H$_4$—Cl | 10 | 50 |
| —CH$_2$—C$_6$H$_4$—OCH$_3$ | 10 | 45 |

2. ANALGESIC PROPERTIES

The compounds of the present invention inhibit the painful stretchings provoked by the intraperitoneal injection of acetic acid in mice.

The results obtained with two of the compounds of general formula (I) as given in Table II below:

TABLE II

| R | Dose administered, Mg./kg./PO | Percentage protection |
|---|---|---|
| —CH$_2$—C$_6$H$_4$—Cl | 100 | 40 |
| —CH$_2$—C$_6$H$_4$—F | 100 | 45 |

HYPOTENSIVE PROPERTIES

This action has been observed in the anaesthetised rat and shown by a prolonged lowering of the arterial pressure registered in the carotide artery.

For example, the administration of 10mg/kg/IV of 4-Propargyloxymethyl 2-p-chlorobenzyl 2-ethoxycarbonyl ε- butyrolactone lowers the arterial pressure by 50 percent within 10 minutes.

As is shown by the results given above and in Table III below the difference between the pharmacologically active dose and the lethal dose is sufficiently great to enable the compounds to be used therapeutically.

TABLE III

| R | Dose administered, g./kg./PO | Mortality (mice) percent |
|---|---|---|
| —CH$_2$—C$_6$H$_5$ | 3 | 50 |
| —CH$_2$—C$_6$H$_4$—Cl | 2 | 50 |
| —CH$_2$—C$_6$H$_4$—F | 2 | 0 |
| —CH$_2$—C$_6$H$_4$—OCH$_3$ | 2 | 0 |

The compounds according to general formula (I) are useful for the treatment of respiratory insufficiencies, pains and aches from various sources and arterial hypertension.

They are administered in the form of tablets or suppositories containing 50 to 400 mg of active ingredient, syrups or drops containing 0.5 to 10 percent of active ingredient or ampules containing 25 to 200 mg of active ingredient.

4-propargyloxymethyl-2-ethoxycarbonyl-ε-butyrolactone can be prepared by the process described in U. S. Pat. application Ser. No. 851757, filed Aug. 20, 1969 by Claude P. Fauran, Guy M. Raynaud, Colette A. Douzon and Claude J. Gouret.

We claim:

1. A compound of the formula

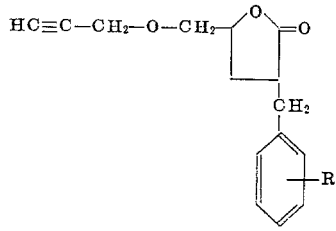

in which R is selected from the group consisting of hydrogen, halogen and lower alkoxy.

2. A compound according to claim 1, in which R is hydrogen.
3. A compound according to claim 1, in which R is p-chloro.
4. A compound according to claim 1, in which R is p-fluoro.
5. A compound according to claim 1, in which R is p-methoxy.

* * * * *